(12) United States Patent
Ihrenberger

(10) Patent No.: US 6,210,113 B1
(45) Date of Patent: Apr. 3, 2001

(54) WATER WHEEL TURBINE FOR WATER POWER STATIONS

(76) Inventor: Adolf Ihrenberger, Kaiser Lothar Str. 19, A-6600 Reutte (AT)

( * ) Notice: Subject to any disclaimer, the term of this patent is extended or adjusted under 35 U.S.C. 154(b) by 0 days.

(21) Appl. No.: 09/445,280

(22) PCT Filed: Apr. 6, 1999

(86) PCT No.: PCT/EP99/02317

§ 371 Date: Jan. 24, 2000

§ 102(e) Date: Jan. 24, 2000

(87) PCT Pub. No.: WO99/51876

PCT Pub. Date: Oct. 14, 1999

(30) Foreign Application Priority Data

Apr. 6, 1998 (EP) ................................... 9810623

(51) Int. Cl.[7] ................................... F03B 7/00
(52) U.S. Cl. .............. 416/116; 416/197 A; 415/3.1; 415/6; 415/141; 415/906
(58) Field of Search ................... 416/101, 116, 416/88, 197 A, 197 B; 415/3.1, 6, 141, 202, 906

(56) References Cited

U.S. PATENT DOCUMENTS

| | | | |
|---|---|---|---|
| 194,897 | * | 9/1877 | DeHaven .............................. 415/141 |
| 652,852 | * | 7/1900 | Libbey .................................. 415/141 |
| 818,825 | * | 4/1906 | Hicks ................................... 416/116 |
| 1,361,467 | * | 12/1920 | Kincaid ............................ 416/197 B |
| 1,773,010 | * | 8/1930 | Rixe . | 
| 4,385,497 | * | 5/1983 | Scott . |

FOREIGN PATENT DOCUMENTS

| | | | |
|---|---|---|---|
| 370513 | * | 3/1923 | (DE) . |
| 4339236 | * | 5/1995 | (DE) . |
| 19517261 | * | 11/1996 | (DE) . |
| 1078558 | * | 11/1954 | (FR) . |

* cited by examiner

Primary Examiner—Christopher Verdier
(74) Attorney, Agent, or Firm—Morgan & Finnegan LLP

(57) ABSTRACT

A waterwheel turbine for application in hydropower plants is provided. This turbine exploits primarily the head of the watercourse for energy recovery. The cells of the waterwheel turbine are each provided with a pair of mechanically linked flaps for controlling the inflow of water as well as venting of air. Special control devices permit these installations to be operated at high efficiency.

9 Claims, 4 Drawing Sheets

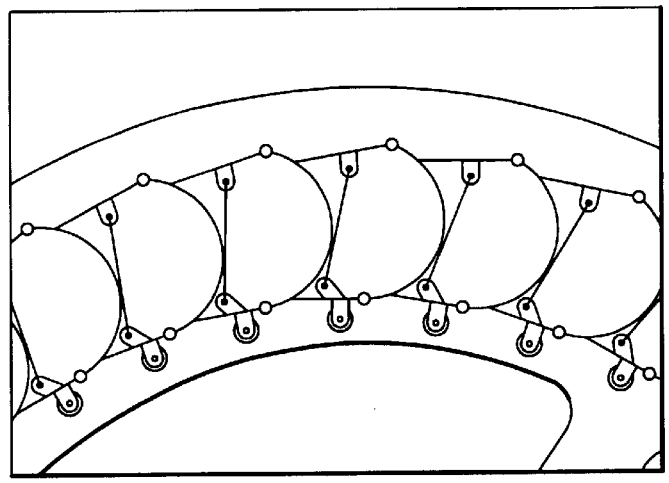
FIG.3.1
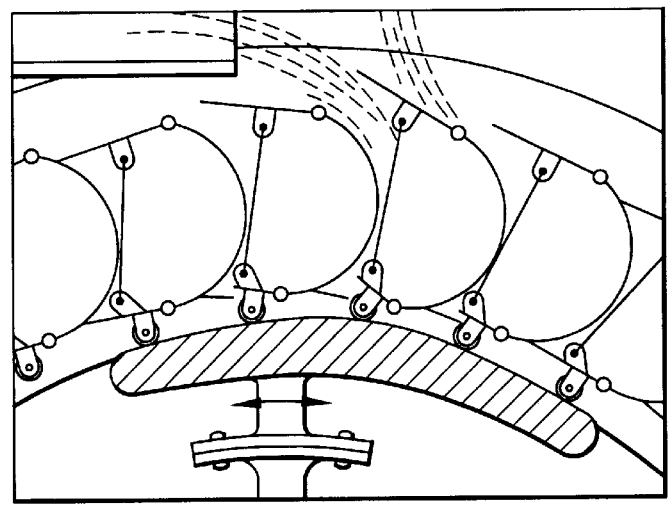
FIG.3.2
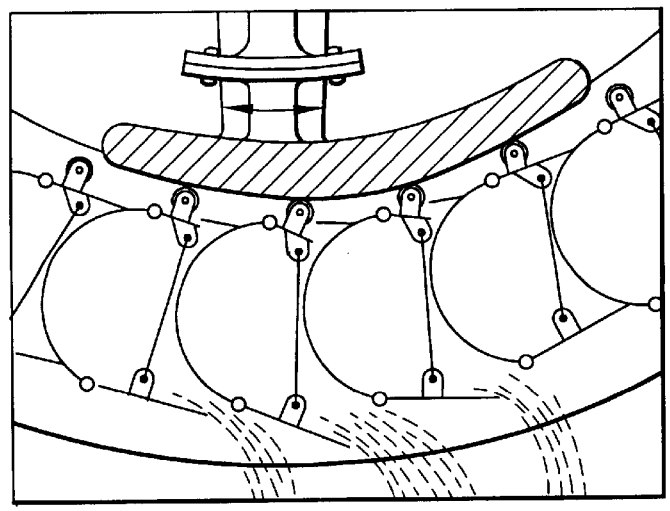
FIG.3.3

WATER WHEEL TURBINE FOR WATER POWER STATIONS

FIELD OF INVENTION

The invention concerns a waterwheel, or rather a waterwheel turbine, for hydropower plants utilizing the head of a watercourse. This waterwheel turbine is characterized by a horizontal wheel shaft and a number of cells uniformly spaced wall-to-wall around the periphery of the wheel. These cells are closed off at each side, and are provided with openings for filling and discharge of water.

BACKGROUND OF THE INVENTION

Waterwheels have been known since antiquity and have served principally for generating mechanical power. With the widespread introduction of commercial plants, in particular for generating electricity, water turbines have largely displaced the waterwheel. Consequently, the efforts devoted in the past decades to further technical development and improvement of the performance of waterwheels have been correspondingly small.

Whereas by definition, waterwheels gain mechanical energy from the potential energy of the water, in waterwheel turbines the potential energy as well as, to a usable degree, the kinetic energy of the flowing water is exploited in appropriately formed buckets, or cell walls. Within the class of turbomachinery, the waterwheel turbine is categorized as an impulse turbine.

Providing an overview of the present status of this technology is the book: *Bau von Wasserkraftanlagen* by König/Jehle, published by C. F. Müller Verlag, third completely revised edition, 1997, containing planning documents for practical applications. Starting on Page 197, one chapter deals with waterwheels. It describes their advantages over turbines, such as comparatively straightforward subsurface works and low-cost, cut-and-cover construction techniques. At the same time, the descriptions of examples of constructed plants present, as a generally accepted disadvantage inherent to this class of devices, the premature outflow of more or less significant water volumes from the amount originally entering each cell, before it attains its submerged level.

The usual graphical representation of the efficiency, $\eta$, of a waterwheel as a function of the quotient, $Q_n/Q$, where $Q_n$ is the normal rated flow and Q the actual flow, makes this clear, as in this the maximum efficiency is always less than unity (100%), and remains unchanged over wide variations of the degree of filling of the cells.

In the past, there has been no lack of proposals for improving the cell geometry of waterwheels, or waterwheel turbines, in particular with designs for minimizing water loss from a cell before it has fully traversed the water head. These were concentrated on a projection of the discharge lip of the cell opening, as well as on cell designs for which the virtual center of gravity of the water filling the cell attains a level which is as low as possible beneath that of the inflow and discharge opening. But in this connection, it is known to the specialist that as the length of a cell increases in the radial direction, the directly usable head between the headrace and the tailrace is reduced by an amount approximately double this cell dimension. Hence, increasing this dimension at the cost of only partially filled cells always represents a disadvantageous compromise referred to the theoretically exploitable water energy.

DE 3621312 A1 describes, for example, a waterwheel whose cup-shaped cells are so formed that the tongue projecting far from a cell wall according to invention, prevents the cups emptying too early.

For the task of better exploiting minor water reserves with low volumetric flow and low head, DE 3938748 C2 proposes a solution in which premature discharge of water from a cell is prevented by a pneumatic sealing system for the cells. In this, sealing of the open cells against stationary external boundaries and walls is by means of sealing rings to which pneumatic pressure is applied. The disadvantage of this solution is that any type of sliding seal gives rise to substantial frictional losses, and therefore reductions in efficiency and also involves wear. A waterwheel turbine in accordance with the generic term of claim 1 is known from U.S. Pat. No. 4,385,497.

The purpose of this invention is therefore, by specially designing the cells of waterwheels, or rather of waterwheel turbines, to increase their efficiency in comparison with known designs, referred to the actual water inflow rate to the plant per unit of time and the actual available head. Alternatively formulated, the task is to fill the cells with the water directed to them by way of a channel rapidly, without appreciable water losses and with a high degree of filling, and to exploit the potential of the filled water mass over an effective height approaching that of the water head to generate torque and transmit energy via the wheel shaft better than in known systems. Apart from the water's potential energy, its impulse energy from filling and emptying the individual cells, which is always exploitable in the case of flowing waters without the need for special measures, is to be effectively converted to torque.

SUMMARY OF THE INVENTION

According to the invention, this task is solved by a waterwheel turbine of the type described above in which the shut-off flap is mechanically connected via a link rod (4) with a second air flap (5), serving to vent air from or admit air to the cell, and the waterwheel turbine possesses a stationary control device with mechanical transmission elements to simultaneously open or close the shut-off and air flaps.

In view of the premature water loss from the cells of a waterwheel installation according to the present state of the art, closing off the cells would appear at first sight to be the obvious design choice. However, in combination with the simultaneous and indispensable requirement to fill and empty the cells within very short periods, apparently this solution has up to now been discarded by the specialist. The problems of air displacement, as are generally known from rapid filling and emptying of bottles, apply equally in this case.

By means of the feature according to the invention—that is mechanical linkage of water shut-off flap and air flap—this problem can be solved surprisingly effectively for the waterwheel turbine by a suitable flap control device. The high degree of cell filling within the short time interval inherent to this system was surprising to the specialist.

The solution employing flaps according to the invention—or rather a pair of flaps—for each cell, requires an effective control device to open and close them. An advantageous design of this control device is to provide for their opening by mechanical means against the force of a compression or tension spring, by a roller rigidly mounted at the outside of the flap, predominantly the air flap, which for its part traverses over the curved surface of a stationary cam at a predetermined point during waterwheel rotation, in this way successively opening the flaps of each cell to a set angle, and then allowing them to close again. The closing action is supported, or made possible, by spring force.

The flaps could just as easily be opened and closed, for example by means of torsionally-loaded springs in the flap hinges.

The stationary control device for operating the flaps could be installed in the hydropower plant outside of the waterwheel turbine.

It is particularly advantageous, however, to mount the control device stationary within the rotating unit.

By mounting the control element on the wheel shaft and fixing it in position by attachment of a comparatively heavy pendulum weight under the shaft, this requirement is very effectively met. Such a solution permits precise flap actuation uninfluenced by relative movements between the wheel and its surroundings. Additionally, this shaft mounting means that the cam can be positioned in any radial direction as seen from the wheel shaft.

But this possibility of positioning the cam at various angles fulfills a first prerequisite for allowing the waterwheel turbine to be applied according to the invention not only in overshot but also in middle-shot and even, if needed in undershot operation.

A second condition for effective application to these various types of operation is the possibility for adjusting actuation of the flaps with regard to timing and maximum flap opening. To suit the type of operation, cams with differing profiles and curvatures may be employed, or the distance between the cam and the transmission elements rigidly attached to the flaps can be varied.

The conventional waterwheel derives its torque primarily from the potential energy of the water. With the waterwheel turbine according to the invention, an appreciable proportion of the power is provided by the kinetic energy of the flowing water. The contribution of this kinetic energy is substantially increased in the solution of a waterwheel turbine according to the invention if, in place of pure overshot incident flow, the water is made to impinge the cell under pressure This may be implemented, for example, by directing the water to the turbine in a closed channel under appropriate pressure as laminar flow for discharge through a wide jet exit.

Because in its intended operation the completely closed cells will open comparatively rapidly only just before they attain their lowest point in the rotational path, as the water flows out, it imparts a reaction impulse to the waterwheel, making an appreciable contribution to the total torque In comparison with the severe water losses some way ahead of the bottom dead center and the failure to exploit the reaction impulse of water discharge as in the current state of the art, this signifies an energy gain from two sources.

Depending on cell wall geometry and the direction of inflow of the water, also when filling the cells an appreciable proportion of the torque could be contributed by the impact of the water on the cell wall.

Designs of the waterwheel turbine according to the invention are limited neither by geometry nor the materials used. Corrosion resistant metal plates could just as easily be used as a design in the form of a cylindrical shell with covers welded onto each end.

A feature of all innovative designs is the wall-to-wall occupancy of a peripheral annulus of the waterwheel turbine with water, which means there are no dead interstitial segments limiting the transportable water volumes, or where cells are not located with immediately adjacent walls, to obtain the same transportable water volume higher cell walls in the radial direction would be needed. Higher cells in the radial direction mean, as stated in connection with the state of the art, a greater reduction of the useable head—the potential height—in comparison to the total water head.

As is known from conventional waterwheels, it is also possible to subdivide the cells of the innovative waterwheel turbines across their widths, so that, for example, with too little flow and a correspondingly reduced inflow channel width, one compartment of a cell can be filled completely, instead of only partially filling the cells across their entire width, which would result in reduced efficiency.

But means to vary the degree of filling of the cells could also be designed and used for controlling the running speed of the novel turbine. The degree of filling could likewise be varied by moving the flap opening point by shifting the cam, or by changing out the control elements.

Whereas conventional waterwheels with open cells in accordance with the state of the art experience no difficulties in starting the wheel running, as the overflow from the topmost filled cells fill in turn the next lowest cells, until a sufficient torque builds up to overcome the static friction between wheel shaft and bearing, this principle cannot be applied to the waterwheel turbine according to the invention. Instead, each cell wall immediately adjacent to a neighboring cell is provided with a suitably dimensioned hole, which during normal rotational operation has no measurable influence on the efficiency, but at startup of the wheel will fill a sufficient number of cells successively to generate the necessary breakaway torque.

The designs of the invention as described above have been limited to pure mechanical solutions, as far as the motions of the flaps and their control device were concerned. For control of the flaps, with or without transmission by way of a cam, also electromagnetic, pneumatic and hydraulic control elements could be used.

All designs according to the invention taken together exhibit the following advantages:

short cell filling times high degree of filling of cells water retained in cells as long as possible up to emptying exploitation of the impulse energy of the water when cells fill exploitation of reaction impulse energy of the water when cells empty optimal utilization of water head quiet running and little noise generated during cells emptying of cells no cavitation from low flow rates no wall friction and turbulence losses very high efficiency, also at partial load long service life with virtually no maintenance can be integrated unobtrusively into the landscape.

A rough calculation indicates that the efficiency of this waterwheel turbine in overshot operation is some 98%, thus substantially exceeding the known values for Kaplan, Pelton, Francis and direct flow turbines. Conventional waterwheels can attain only substantially lower efficiencies. However, even in middle-shot and undershot operation, the advantage of the adjustability of the shut-off and air flaps proves its worth. In the last-named operation case, with conventional cells and bucket geometries, substantial braking losses occur during immersion in the water.

The torque generated by the waterwheel turbine is taken off from the wheel shaft, either via gearbox and transmission elements to mechanically drive machinery, or via coupled electricity generators.

By applying new technologies, such as controlled frequency converters as current or voltage converters in two- or four-quadrant operation, "gearless" electricity generation equipment may be provided, through which a high economic value must be assigned to plants exploiting hydropower according to the invention (small and micro hydropower plants). Such concepts are appropriate for solving today's problems of electricity generation by low-speed waterwheels, as well as problems of matching rotational speed to synchronous speeds, parallel network operation and island operation at stable frequency.

The waterwheel turbine's quietness of running and absence of the appreciable noise generated by conventional waterwheels as they discharge from a large height on the one hand, and from the mechanical transmission elements on the other, permit gearless electricity generation even in areas which are sensitive under environmental policy aspects.

Increasing environmental awareness, for instance in connection with $CO_2$ discharges, extends the applicability of waterwheel turbines according to the invention also into the range of micro hydropower plants. The endeavor to apply renewable energies in preference to other forms likewise favors its application.

DESCRIPTION OF THE DRAWINGS

In the following, the invention will be described in greater detail on the basis of the figures, which illustrate a design example.

FIGS. 3.1–3.3 shows in a sequence of schematics the three basic operating conditions of a waterwheel turbine according to the invention, specifically its cells, as depicted in FIG. 1, with closed cells during the rotation phase, as well as cells as they open and close during the filling and emptying phases.

Figure 1:
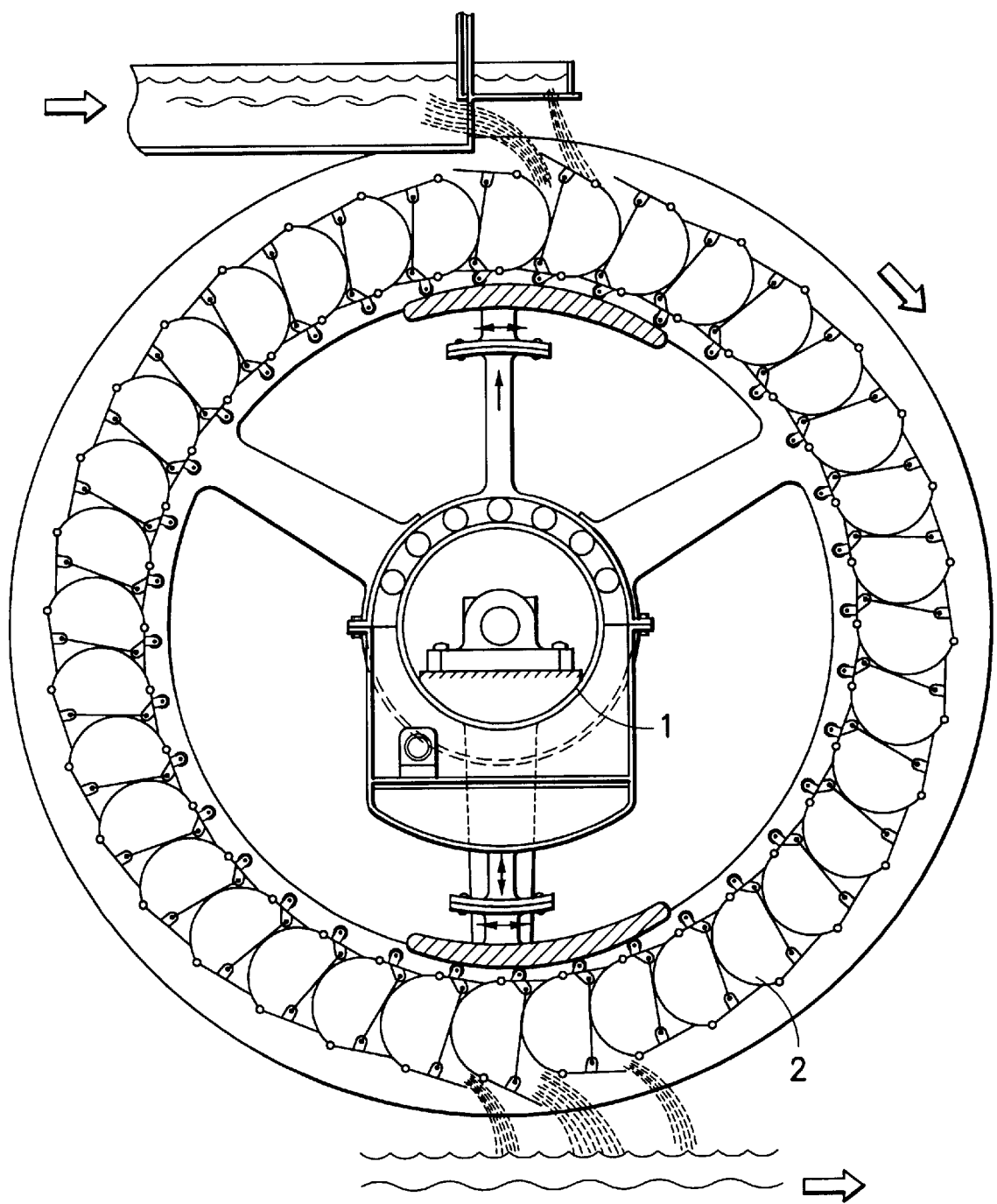
FIG. 1 shows a schematic of the innovative waterwheel turbine in side elevation in its preferred overshot design.
Figure 5:
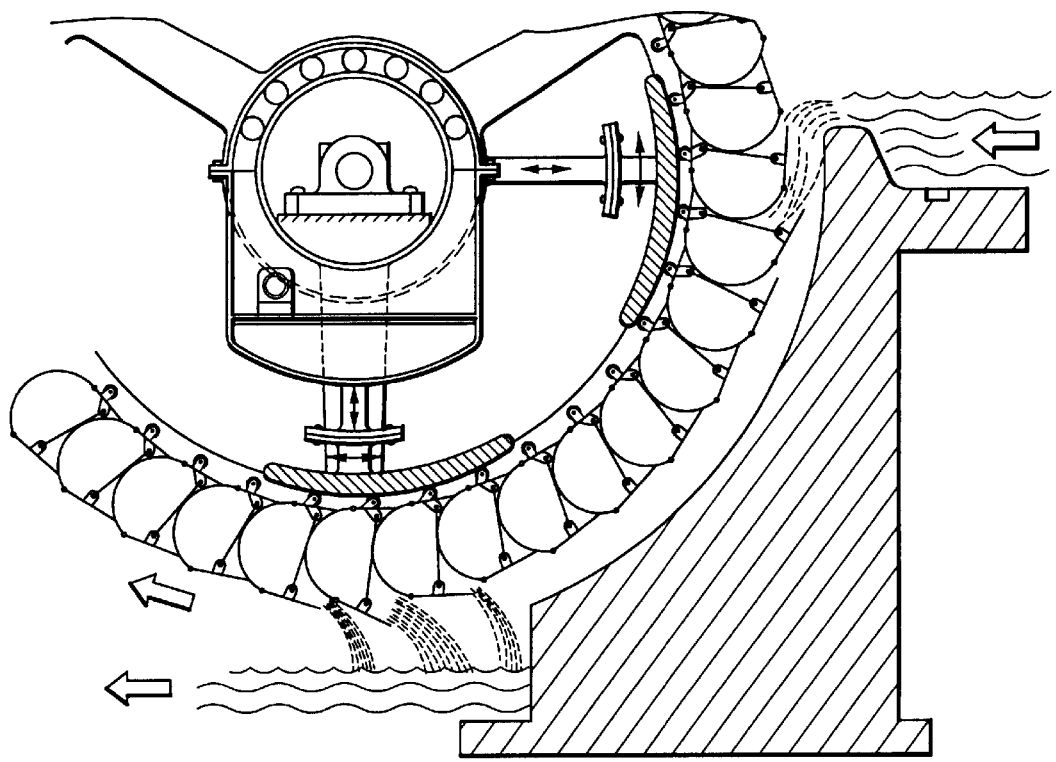
FIG. 5 shows a segment of a waterwheel turbine like in FIG. 1, but in middle-shot operation.
Figure 6:
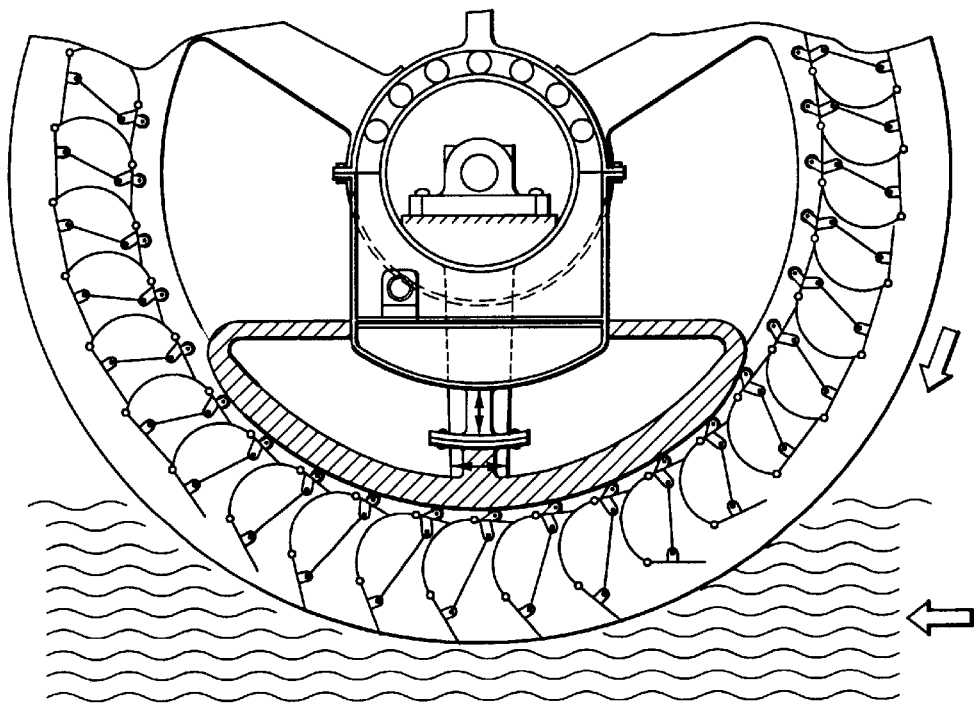
FIG. 6 shows a segment of a waterwheel turbine like in FIG. 1, but in undershot operation.

The figures show the preferred design of the waterwheel turbine in overshot operation (FIG. 1), but also in middle-shot (FIG. 5) and in undershot (FIG. 6) operation. From the figures, the various preferred extents of water flap opening can be seen, in each case to suit the type of operation.

DETAILED DESCRIPTION OF THE INVENTION

A lightweight hollow wheel shaft (1) supports the hub of the waterwheel turbine and the latter is connected through spokes to the two wheel rims (9), serving to support the cells (2), and at the same time providing the end limits of the closed cells.

A cell is filled with water by way of the shut-off flap (3) held open in the correct position, which in turn is connected mechanically via a rod (4) with an air flap (5). This pair of flaps is actuated by a roller (7). This roller serves as transmission element for the control commands, generated by the roller traversing the face of a profiled cam (8), to impart the opening and closing motions to the pair of flaps.

FIG. 3.2 illustrates the continuously changing flap position as the cells fill, and FIG. 3.3 the situation as the cells empty.

Mounting of the cells with no gaps between them and the successive positions of the cell shut-off flaps permit a high degree of cell filling.

Figure 4:
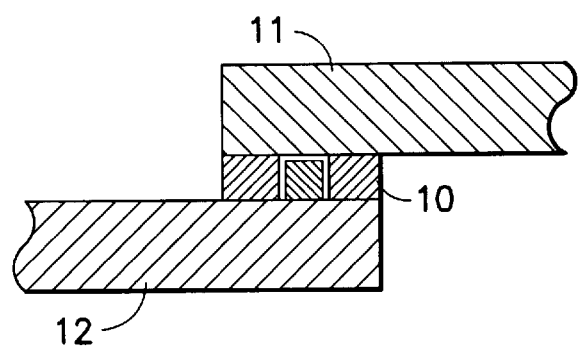
FIG. 4 shows in a detail of FIG. 1 the flap closure mechanism of a cell.

FIG. 4 shows in accordance with a preferred design, how the cells can be adequately sealed by square bar sections (10) attached to the shut-off flap (11) and the fixed cell wall (12).

Figure 2:
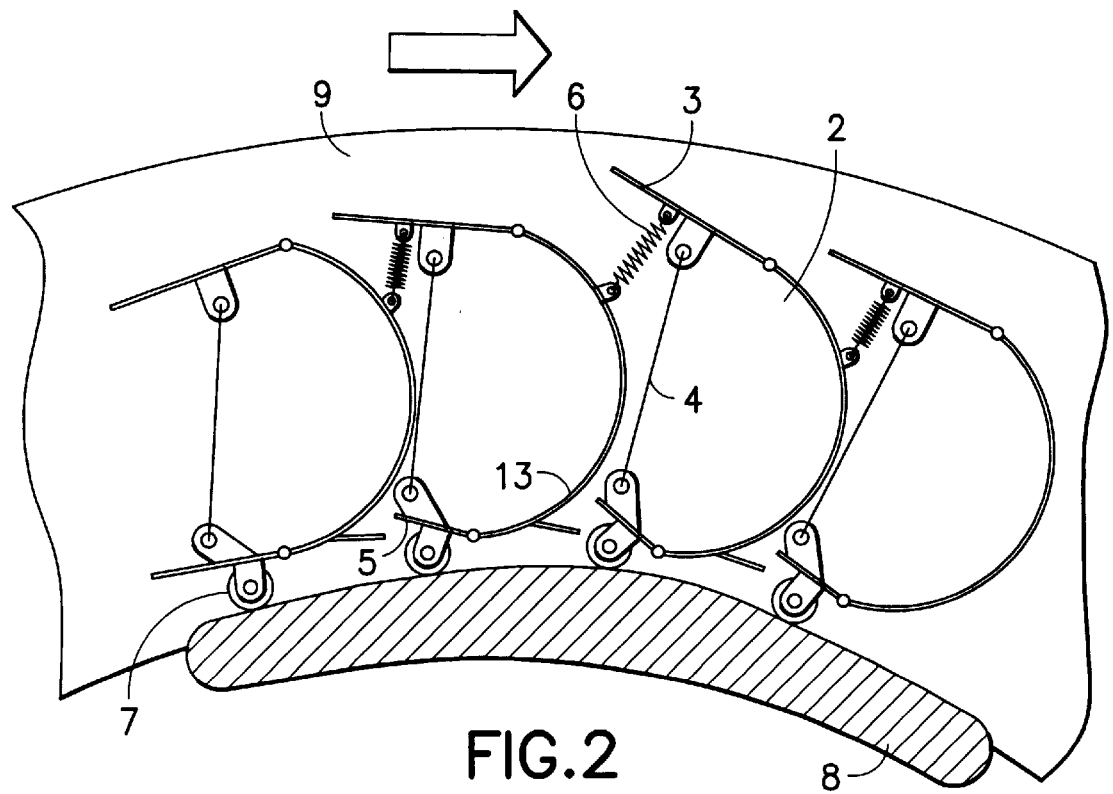
FIG. 2 shows a detail of FIG. 1 in section.

The pair of flaps open against the force of the tension spring 6, as shown particularly clearly in FIG. 2.

During rotation away from their filling points, the cells remain closed, as shown in FIG. 3.1, until just before the bottom dead center, they are made to empty with the same control mechanism as used for filling The air flap (5) of each cell serves both for air release during filling and to admit air during emptying.

This effective cell venting arrangement can be ensured by taking measures known in the art when designing cell wall and flaps, for example by mounting flow baffles in the cell.

The high efficiency of the illustrated waterwheel turbine in exploiting the potential energy of the water is appreciably supplemented by additionally utilizing the impulse energy of the water as it enters and leaves the cells. Of decisive importance for this is that the opening and closing points of the cells be precisely controlled as the wheel rotates. This can only be done with cells that can be closed.

Problems of blocking the impinging water jet by the next cell as are known from wheels with fixed buckets, like the Pelton wheel, do not arise with the waterwheel turbine, as this can be eliminated by adjusting the approach angle of the shut-off flap.

The cam forms a part of the complete control device, which is mounted stationary on the wheel shaft. This device is thus a component of the installation which retains its spatial location. Whereas one of the two required cams is always arranged in the emptying section, the other one needed for controlling admission of the water can be mounted in any position radially around the wheel by adjusting the associated location element relative to the stationary pendulum weight as required, and connecting this element to the weight with a detachable fastener. The double-ended arrows marked in FIG. 1 on the location elements for the cam indicate that these permit fine positioning of the cams, and thus also fine adjustment of flap motions.

To ensure self-starting of the waterwheel turbine, a hole is bored through the wall of each cell (13). This allows, starting from filling of the cell in the filling position, successive slow filling of the preceding cells, until the breakaway torque needed for starting wheel motion is generated.

What is claimed is:

1. A waterwheel turbine for hydropower plants using a head of water, with a horizontal turbine shaft and a plurality of wall-to-wall disposed cells closed at their end faces, said cells accepting and discharging water through cell openings, each cell opening having a closing flap, characterized in that the closing flap is mechanically connected by a linkage to an air flap serving the purpose of ventilation and air admission, and in that the waterwheel turbine has a stationary control device and mechanical transmission elements for the simultaneous opening and closing of the closing flap and air flap.

2. A waterwheel turbine according to claim 1, wherein the control device is mounted in a stationary manner on the turbine shaft.

3. A waterwheel turbine according to claim 1, wherein the control device has elements by means of which the flaps of the cell are opened and closed in different, predeterminable radial directions with reference to the turbine shaft.

4. A waterwheel turbine according to claim 1, wherein the control device has transmission elements by means of which individual pairs of flaps are continuously opened and closed within a predetermined radial-angle range with reference to the turbine shaft.

5. A waterwheel turbine according to claim 4, wherein the transmission elements are a roller, rigidly connected to a flap, and a stationary cam plate, the roller rolling over the cam surface of the cam plate.

6. A waterwheel turbine according to claim 1, wherein the control device has elements by means of which the maximum opening width of a pair of flaps is variably adjustable.

7. A waterwheel turbine according to claim 1, wherein attached to the flap is a mechanical spring by means of which the closed pair of flaps is opened against the force of the spring.

8. A waterwheel turbine according to claim 1, wherein the control device comprises hydraulically or pneumatically controllable elements for opening and closing individual pairs of flaps.

9. A waterwheel turbine according to claim 1, wherein the components thereof are designed for the admission of water also at higher pressure.

* * * * *